W. J. Clark

Making Bolts.

No. 1,916. Reissued Mar. 28, 1865.

Witnesses:
N. W. Hilborn
Jno. D. Patton

Inventor:
William J. Clark.
By atty A. B. Stoughton.

THE GRAPHIC CO. PHOTO-LITH. 39 & 41 PARK PLACE, N.Y.

UNITED STATES PATENT OFFICE.

WILLIAM J. CLARK, OF SOUTHINGTON, CONNECTICUT.

IMPROVEMENT IN DIES FOR CARRIAGE-BOLTS.

Specification forming part of Letters Patent No. 43,669, dated August 2, 1864; antedated February 2, 1864; Reissue No. 1,916, dated March 28, 1865.

DIVISION A.

*To all whom it may concern:*

Be it known that I, WILLIAM J. CLARK, of the town of Southington, in the county of Hartford and State of Connecticut, have invented a new and useful Improvement in the Manufacture of Bolts from Round Rods or Bars; and I do hereby declare the following to be a full, clear, and exact description of the same, reference being had to the accompanying drawings, making a part of this specification, in which—

Figure 1:
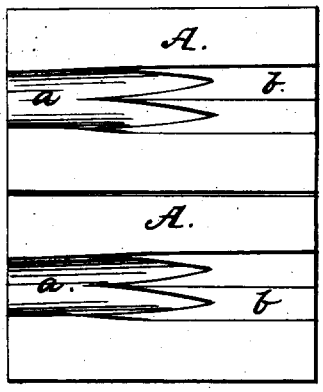
Figure 2:
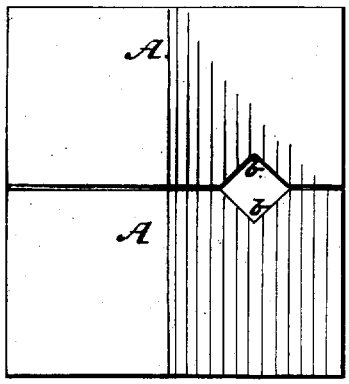
Figure 3:
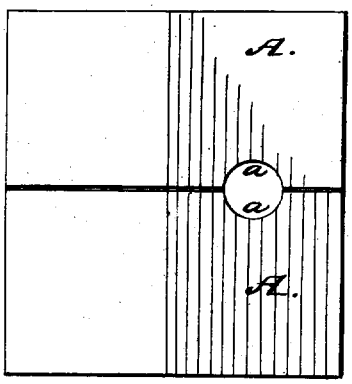
Figure 4:
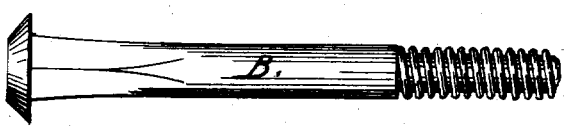

Figure 1 represents a view of the dies as when opened up. Fig. 2 represents the front or anvil end of the dies. Fig. 3 represents the rear or cylindrical end of the dies. Fig. 4 represents the bolt as complete, and of one form of head; but I do not confine myself to any particular form of head.

The nature of this part of my invention consists in the use of metallic dies for the purpose of giving an angular shape to a portion of a cylindrical bolt by compression laterally, leaving the remaining portion of the bolt in its original round form, and which dies at the same time serve the purpose of an anvil upon which the head of the bolt is formed by upsetting a projecting portion thereof.

To enable others skilled in the art to make and use my invention, I will proceed to describe the same with reference to the drawings.

I construct a pair of dies, A A, of cast-iron or other metal, making the grooves therein for a portion of their length of a semi-cylindrical form, as shown at *a*, and the remaining portion, *b*, of an angular form. Each die A being provided with a groove of this character, will permit the two, when placed together, to present at one end a cylindrical opening corresponding in diameter to that of the cylindrical bolt-blank, while the opening at the opposite end, instead of being cylindrical, will be square or angular, but of similar sectional area as that of the cylindrical end, so that when the two dies are forced together upon the bolt-blank (which has been previously heated to a proper degree) that part of the blank lying within the angular portion of the groove will be swaged out and forced to take the angular form corresponding to that of the angular portion of the groove, and the part lying within the cylindrical portion of the groove will retain its original shape. The dies thus holding and containing the partially-wrought bolt-blank form an anvil upon which a portion of the blank projecting from the dies, and at the end thereof which contains the angular groove, is upset and formed into a head by any proper machinery that will drive said projecting portion of the blank toward the body or shank of the bolt and give it the desired shape or form.

The square or angular grooves in the dies are of such length as will give the required square or angular form to the bolt, and thence merging into the semi-cylindrical form of the grooves in the dies, which are made to conform to the size of the rod to be used in them.

B, Fig. 4, represents a bolt made in the dies, and after the herein-described manner of procedure. Its round and its square or angular portions are of similar sectional areas; but the diameter of the round portion is greater than the distance from face to face on the square portion, as shown by the round and square or angular openings in the dies, while the distance from corner to corner, diagonally, of the square portion of the bolt is greater than the diameter of the round portion, so that the sectional areas of the two portions may be same, while their forms are changed by the act of making the square or angular portion in the dies.

Having thus fully described my invention, what I claim under this patent is—

The combination and use of metallic dies for the purpose of giving an angular shape or form to a portion of a cylindrical bolt by compression laterally, leaving the remaining portion of the bolt in its original round form, and which dies also serve the purpose of an anvil upon which the head of the bolt is formed by upsetting a projecting portion thereof, substantially as described.

WM. J. CLARK.

Witnesses:

A. B. STOUGHTON,

HAVER. FENDRICH.